Patented Aug. 8, 1944

2,355,271

UNITED STATES PATENT OFFICE 2,355,271

FERROUS ALLOYS

Arthur T. Cape, Santa Cruz, Calif., assignor to Coast Metals, Inc., Canton, Ohio, a corporation of Delaware No Drawing. Application August 26, 1942, Serial No. 456,221

6 Claims. (Cl. 75—128)

This invention relates generally to ferrous alloys, but has reference more particularly to an alloy which is especially adapted for use in the form of weld rods for hard facing purposes.

It has heretofore been proposed to use cobalt base alloys containing virtually no iron, for hard facing purposes, particularly for applications characterized by repeated loading at high temperatures, such for example, as hot shear blades, hot trimming dies, valves under continuous or intermittent load, etc.

In view of the scarcity of cobalt and certain other strategic metals, not available in as large quantities as desired for war purposes, or too expensive, even when available in substantial amounts, I have developed an alloy which is essentially a ferrous base alloy, which can be used to advantage for the above-stated and related purposes, and which contains cobalt, as well as other alloying elements, in lesser amounts than are found in the cobalt base alloys to which reference has been made.

The alloy of my invention contains from about 1% to about 4.5% carbon, from about 20% to about 30% chromium, from about 7% to about 20% molybdenum, more than 13% and up to about 17% nickel, from about 10% to about 30% cobalt, with the balance substantially all iron. An alloy within this range which has been found particularly useful contains about 2.5% carbon, about 25% chromium, about 15% nickel, about 8% molybdenum, about 25% cobalt, and about 24.5% iron.

The foregoing alloys are especially advantageous in that they can be easily and quickly manufactured by melting together various commonly-known ferro-alloys, which are available in substantial amount. Since the alloy contains relatively large amounts of carbon, the alloy can be made by simply melting together ferro-alloys of selected relatively low-carbon analyses, and without requiring refinement or special treatment to reduce the carbon content to the desired values. Moreover, since the alloy contains relatively large amounts of carbon, the alloy is essentially an iron base alloy, and is therefore less expensive than the heretofore used cobalt-base alloys, to which reference has been made.

Although the alloy has been described particularly as a hard facing alloy, preferably made into weld rods for this purpose, it will be understood that it may also be used in the form of castings or finished articles.

The alloy is particularly advantageous, in that, due primarily to its relatively high nickel content, it has a rigidity at high temperatures which I have not been able to attain by the use of the alloy described in my Patent No. 2,313,420.

I claim:

1. A ferrous alloy particularly adapted for hard facing purposes, said alloy containing carbon in amounts of from about 1% to about 4.5, about 20% to about 30% chromium, about 7% to about 20% molybdenum, more than 13% and up to about 17% nickel, and about 10% to about 30% cobalt, the remainder of the alloy being substantially all iron.

2. A ferrous alloy particularly adapted for hard facing purposes, said alloy containing about 2.5% carbon, about 25% chromium, about 15% nickel, about 8% molybdenum, and about 25% cobalt, the remainder of the alloy being substantially all iron.

3. A weld rod for hard facing purposes, said rod comprising a ferrous alloy containing carbon in amounts of from about 1% to about 4.5%, about 20% to about 30% chromium, about 7% to about 20% molybdenum, more than 13% and up to about 17% nickel, and about 10% to about 30% cobalt, the remainder of the alloy being substantially all iron.

4. A weld rod for hard facing purposes, said rod comprising a ferrous alloy containing about 2.5% carbon, about 25% chromium, about 15% nickel, about 8% molybdenum, and about 25% cobalt, the remainder of the alloy being substantially all iron.

5. An article having a facing thereon comprising a ferrous alloy containing carbon in amounts of from about 1% to about 4.5%, about 20% to about 30% chromium, about 7% to about 20% molybdenum, more than 13% and up to about 17% nickel, and about 10% to about 30% cobalt, the remainder of the alloy being substantially all iron.

6. An article having a facing thereon comprising a ferrous alloy containing about 2.5% carbon, about 25% chromium, about 15% nickel, about 8% molybdenum, and about 25% cobalt, the remainder of the alloy being substantially all iron.

ARTHUR T. CAPE.